United States Patent
Zhuo et al.

(10) Patent No.: US 11,762,939 B2
(45) Date of Patent: Sep. 19, 2023

(54) MEASURE GUI RESPONSE TIME

(71) Applicant: International Business Machines Corporation, Armonk, NY (US)

(72) Inventors: Ling Zhuo, Beijing (CN); Pei Pei Liang, Beijing (CN); Lin Yan Wu, Xi'an (CN); Li Zhou, Beijing (CN); Yue Yang, Beijing (CN); Yun Bo Zhang, Weifang (CN); Tao Wen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/411,297

(22) Filed: Aug. 25, 2021

(65) Prior Publication Data
US 2023/0063608 A1 Mar. 2, 2023

(51) Int. Cl.
G06F 40/14 (2020.01)
G06F 16/957 (2019.01)
G06N 5/04 (2023.01)
G06F 18/21 (2023.01)
G06F 18/22 (2023.01)
G06V 30/18 (2022.01)

(52) U.S. Cl.
CPC .......... *G06F 16/9574* (2019.01); *G06F 18/21* (2023.01); *G06F 18/22* (2023.01);
(Continued)

(58) Field of Classification Search
CPC ..... G06F 16/9574; G06F 40/14; G06V 10/56; G06K 9/6215; G06K 9/6217; G06N 5/04
(Continued)

(56) References Cited

U.S. PATENT DOCUMENTS 9,910,756 B2 3/2018 Covell et al.
10,360,126 B2 7/2019 Covell et al.
(Continued)

FOREIGN PATENT DOCUMENTS

CN 104424092 B 1/2018
CN 104394026 B 2/2019
(Continued)

OTHER PUBLICATIONS

Quental et al., "Automating GUI Response Time Measurements in Mobile and Web Applications," 2019 IEEE/ACM 14th Annual Workshop on Automation of Software Test (AST), Montreal, Canada, May 2019, 7 pages.
(Continued)

*Primary Examiner* — Kavita Stanley
*Assistant Examiner* — Tionna M Burke
(74) *Attorney, Agent, or Firm* — Van Leeuwen & Van Leeuwen; Matthew C. Zehrer

(57) ABSTRACT

An approach is disclosed that determines an amount of time before a webpage is ready to use by a user by performing various actions. The approach captures a recording of the webpage from an invocation of the webpage for a period of time sufficient to load completely load the webpage with the capturing resulting in sequenced image frames. An AI system provides a loading point in the sequenced image frames based on an analysis of the frames input to the trained AI system. Image diversity and saturation measurements are calculated on consecutive image frames from the sequenced image frames resulting in an image change analysis. Native webpage events and times are detected from webpage characteristics gathered from the captured digital recording. The amount of time is then calculated based on the loading point from the AI system, the image change analysis; and the webpage events and their corresponding times.

17 Claims, 10 Drawing Sheets

(52) U.S. Cl.
CPC ............... *G06F 40/14* (2020.01); *G06N 5/04* (2013.01); *G06V 30/18105* (2022.01)

(58) Field of Classification Search
USPC ......................................................... 715/201
See application file for complete search history.

(56) References Cited

U.S. PATENT DOCUMENTS

| | | | |
|---|---|---|---|
| 2010/0251217 A1* | 9/2010 | Miller ................. | G06F 11/3664 717/126 |
| 2011/0043535 A1* | 2/2011 | Kwiatkowski ........ | G06T 11/001 345/604 |
| 2012/0027295 A1* | 2/2012 | Shao ....................... | G06F 16/70 382/170 |
| 2012/0204094 A1* | 8/2012 | Liang ................. | G06F 11/3495 715/234 |

FOREIGN PATENT DOCUMENTS

| | | |
|---|---|---|
| CN | 106326098 B | 9/2020 |
| WO | 2020056878 A1 | 3/2020 |

OTHER PUBLICATIONS

Ghattis et al., "Performance Evaluation of Websites Using Machine Learning," EIMJ, College of Computer Science & Technology, Al-Quds University, Palestine, 2020, 22 pages.

\* cited by examiner

MEASURE GUI RESPONSE TIME

BACKGROUND

Response time in graphical user interface (GUI) pages aids in user satisfaction. Webpages are increasingly graphic in nature often requiring a substantial amount of data to be sent from a web server to a client's computer system so that the webpage can be rendered properly on the user's display device. Long response times contribute to a user being dissatisfied by a website and might result in the user leaving the website. User retention at a website is important and often contributes to monetary flows to the website owner, in terms of revenue, traffic, sales, and the like.

SUMMARY

An approach is disclosed that determines an amount of time before a webpage is ready to use by a user by performing various actions. The approach captures a recording of the webpage from an invocation of the webpage for a period of time sufficient to load completely load the webpage with the capturing resulting in sequenced image frames. An AI system provides a loading point in the sequenced image frames based on an analysis of the frames input to the trained AI system. Image diversity and saturation measurements are calculated on consecutive image frames from the sequenced image frames resulting in an image change analysis. Native webpage events and times are detected from webpage characteristics gathered from the captured digital recording. The amount of time is then calculated based on the loading point from the AI system, the image change analysis; and the webpage events and their corresponding times.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-10 describe an approach that determines an amount of time before a webpage is ready to use by a user by performing various actions. The approach captures a recording of the webpage from an invocation of the webpage for a period of time sufficient to load completely load the webpage with the capturing resulting in sequenced image frames. An AI system provides a loading point in the sequenced image frames based on an analysis of the frames input to the trained AI system. Image diversity and saturation measurements are calculated on consecutive image frames from the sequenced image frames resulting in an image change analysis. Native webpage events and times are detected from webpage characteristics gathered from the captured digital recording. The amount of time is then calculated based on the loading point from the AI system, the image change analysis; and the webpage events and their corresponding times.

The approach leverages artificial intelligence (AI) technology to simulate human perception on web page response, combining web page technology to detect "ready for view" time in automation performance tests. The approach provides a measurement for webpage/webapp performance test: time of "ready for viewing" by a user. AI technology is leveraged on computer vision and video classification to simulate human perception on web page GUI response. Optimization technology is applied to combine web page technology to determine the "ready for viewing" time in automation test on web-based applications.

The approach is focused on the "ready for viewing" time for webpage. It measures accurately on human feeling on Web page response time, which is a criterion used to retain users in website development. This measurement is often more meaningful than existing timing for "page loading," "first byte received," "all data received," and other traditional webpage events. The approach provides a practicable method and framework to that measures "ready for viewing" time, leveraging computer vision, deep learning and web technology to simulate human feeling on visualization. The approach could further be used in automation performance test to save development and testing resources. The approach's framework provides a customization entry on timeline analysis. In this manner, the tester/user can ascertain accurate a more accurate "ready for viewing" time for a specific page according to customized web programming tactics, such as prefetch caching, periodical refresh, etc.

Figure 1:
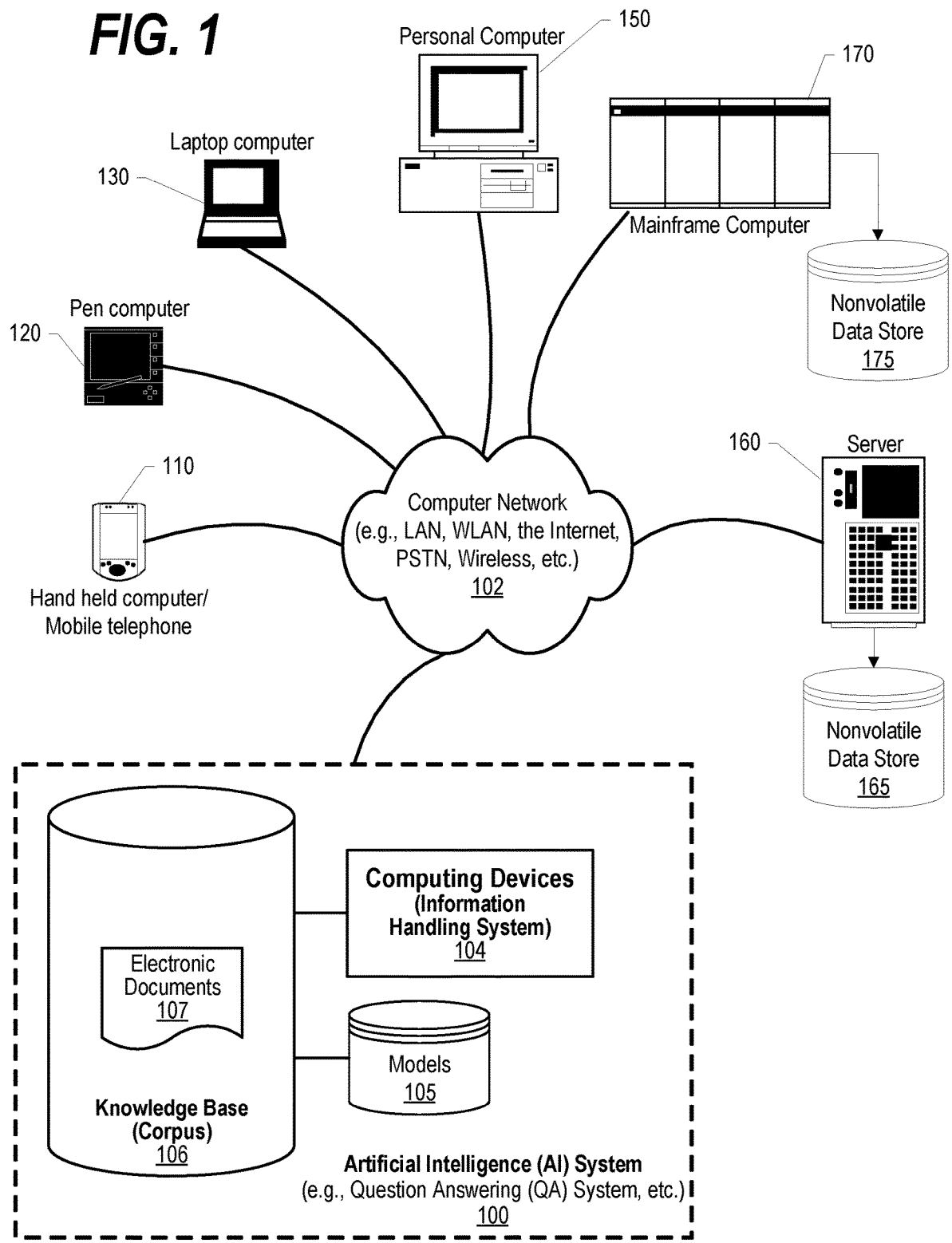
FIG. 1 depicts a network environment that includes a knowledge manager that utilizes a knowledge base.

FIG. 1 depicts a schematic diagram of one illustrative embodiment of artificial intelligence (AI) system 100 in a computer network 102. AI system 100 includes artificial intelligence computing device 104 (comprising one or more processors and one or more memories, and potentially any other computing device elements generally known in the art including buses, storage devices, communication interfaces, and the like) that connects AI system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. AI system 100 and network 102 may enable functionality, such as question/answer (QA) generation functionality, for one or more content users. Other embodiments of AI system 100 may be used with components, systems, sub-systems, and/or devices other than those that are depicted herein.

AI system 100 maintains knowledge base 106, also known as a "corpus," which is a store of information or data that the AI system draws on to solve problems. This knowledge base includes underlying sets of facts, assumptions, models, and rules which the AI system has available in order to solve problems.

AI system 100 may be configured to receive inputs from various sources. For example, AI system 100 may receive input from the network 102, a corpus of electronic documents 107 or other data, a content creator, content users, and other possible sources of input. In one embodiment, some or all of the inputs to AI system 100 may be routed through the network 102. The various computing devices on the network 102 may include access points for content creators and content users. Some of the computing devices may include devices for a database storing the corpus of data. The network 102 may include local network connections and remote connections in various embodiments, such that artificial intelligence 100 may operate in environments of any size, including local and global, e.g., the Internet. Additionally, artificial intelligence 100 serves as a front-end system that can make available a variety of knowledge extracted from or represented in documents, network-accessible sources and/or structured data sources. In this manner, some processes populate the artificial intelligence with the artificial intelligence also including input interfaces to receive knowledge requests and respond accordingly.

In one embodiment, the content creator creates content in electronic documents 107 for use as part of a corpus of data with AI system 100. Electronic documents 107 may include any file, text, article, or source of data for use in AI system 100. Content users may access AI system 100 via a network connection or an Internet connection to the network 102, and, in one embodiment, may input questions to AI system 100 that may be answered by the content in the corpus of data. As further described below, when a process evaluates a given section of a document for semantic content, the process can use a variety of conventions to query it from the artificial intelligence.

Types of information handling systems that can utilize AI system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
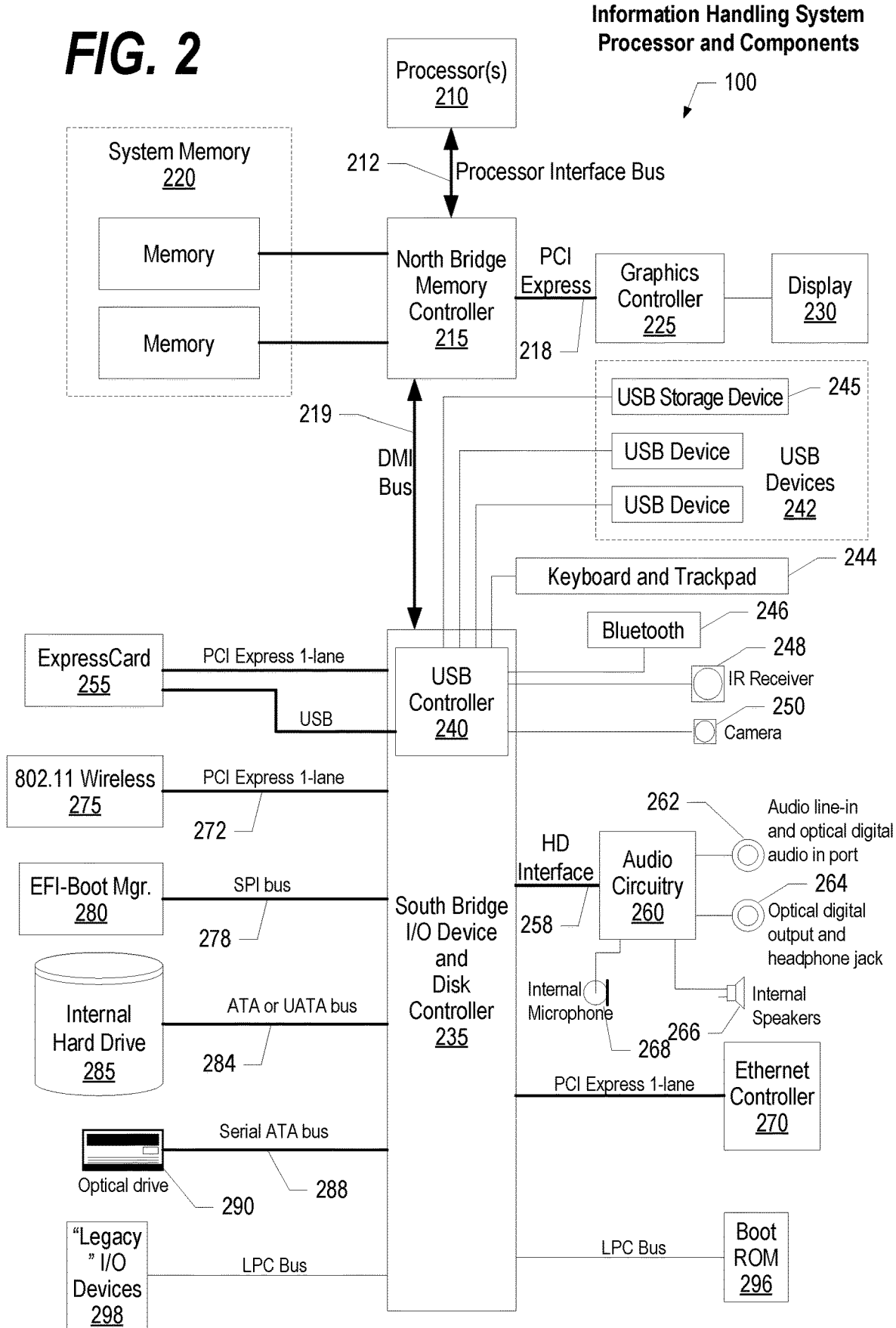
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
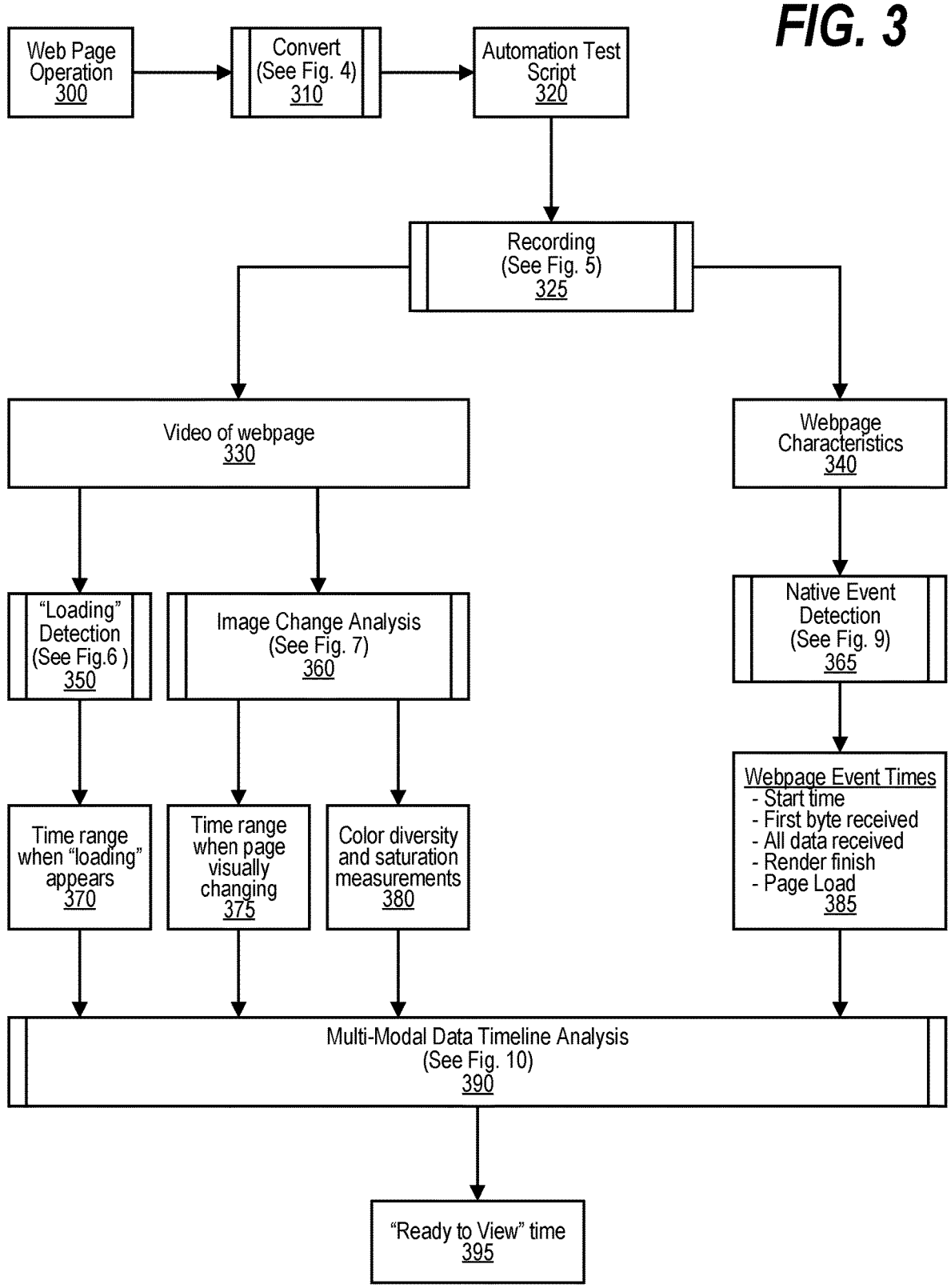
FIG. 3 is a high-level diagram that shows overall steps used to measure Graphical User Interface (GUI) response time.

FIG. 3 is a high-level diagram that shows overall steps used to measure Graphical User Interface (GUI) response time. Web page operations 300 are provided to predefined process 310 that converts the webpage operations to automation test script 320 (see FIG. 4 and corresponding text for details). The automation test script is performed on the webpage.

Figure 5:
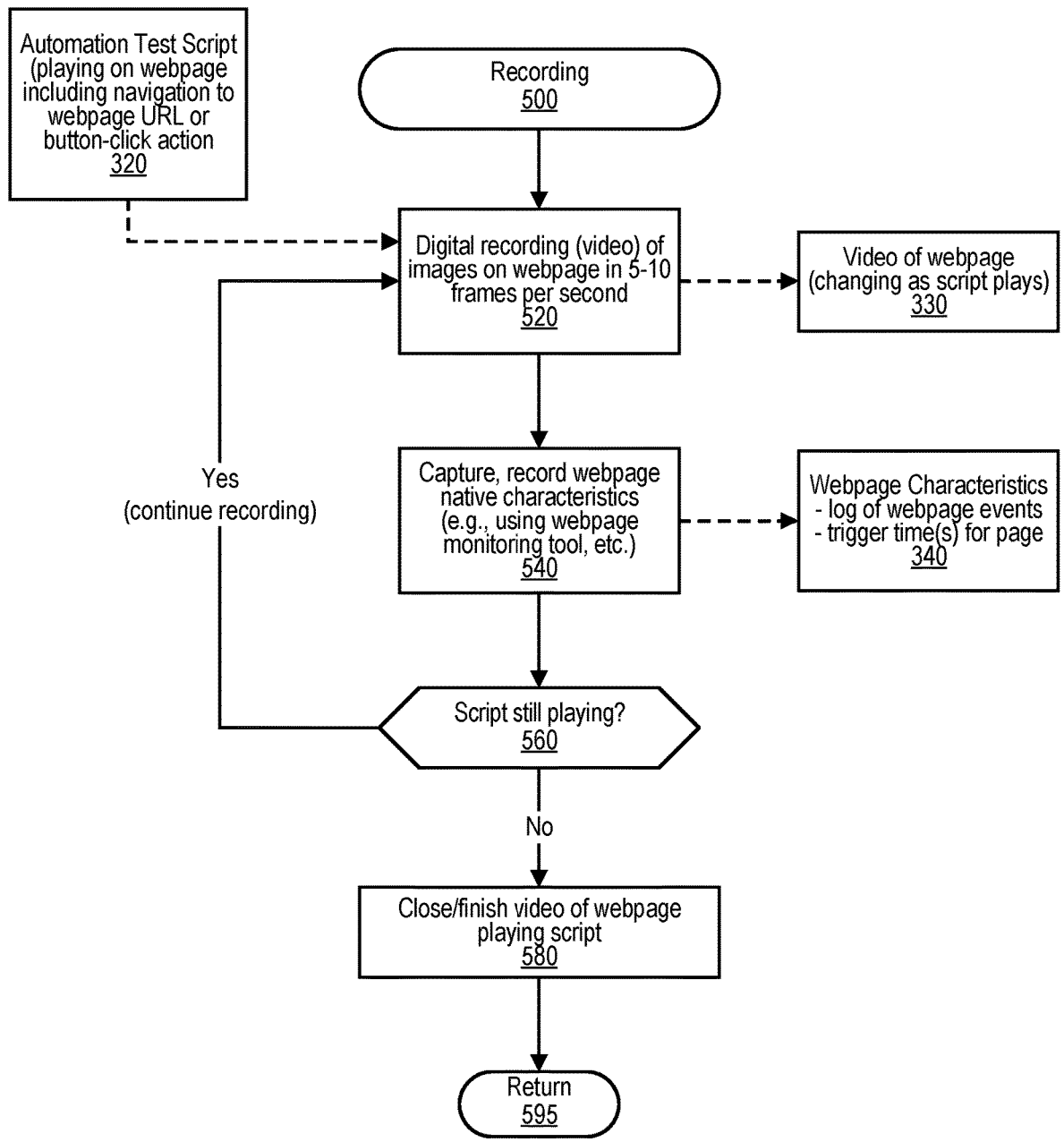
FIG. 5 is a depiction of a flowchart showing the logic used to record the running of the automation test script on a webpage.

Predefined process 325 is performed to record the running of the automation test script on the webpage (see FIG. 5 and corresponding text for details). The running of the automation test script on the webpage results in digital video recording 330 of the webpage while the automation test script is running with the digital video recording including any number of frames. In one embodiment, the video captures five to ten frames per second as the test script is running on the webpage. In one embodiment, the recording starts when the webpage is first invoked and continues for at least a few seconds until after it is understood that the webpage has been fully loaded and is ready to view by a user of the webpage. Webpage characteristics 340 of the webpage that is being run by the test script are also gathered for further analysis.

Figure 6:
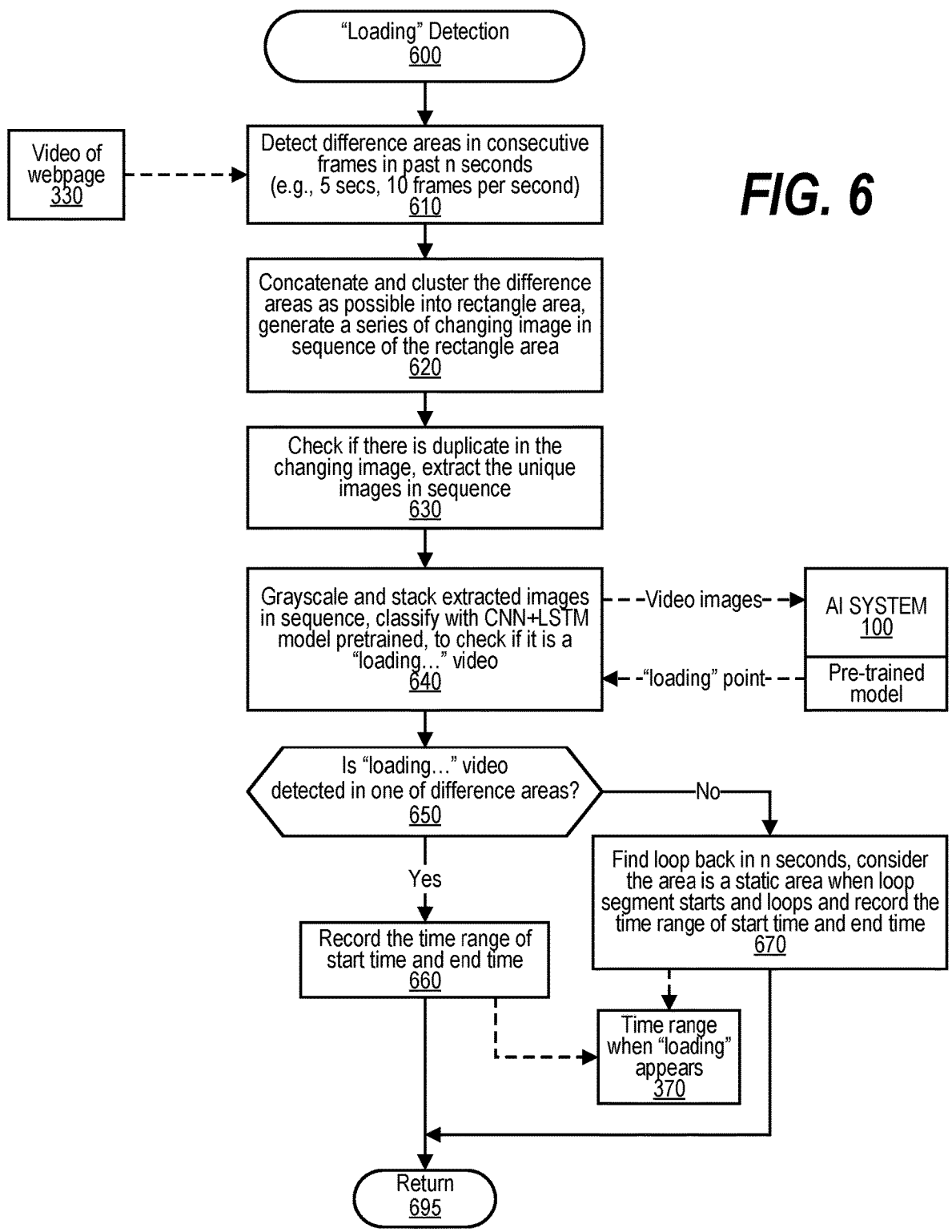
FIG. 6 is a depiction of a flowchart showing the logic used to detect the loading of a webpage from the recorded video.

At predefined process 350, the process performs the "Loading" Detection routine (see FIG. 6 and corresponding text for processing details). This routine uses artificial intelligence (AI) to ascertain an amount of time when the "loading" of the webpage appears with this data being stored in data store 370.

Figure 7:
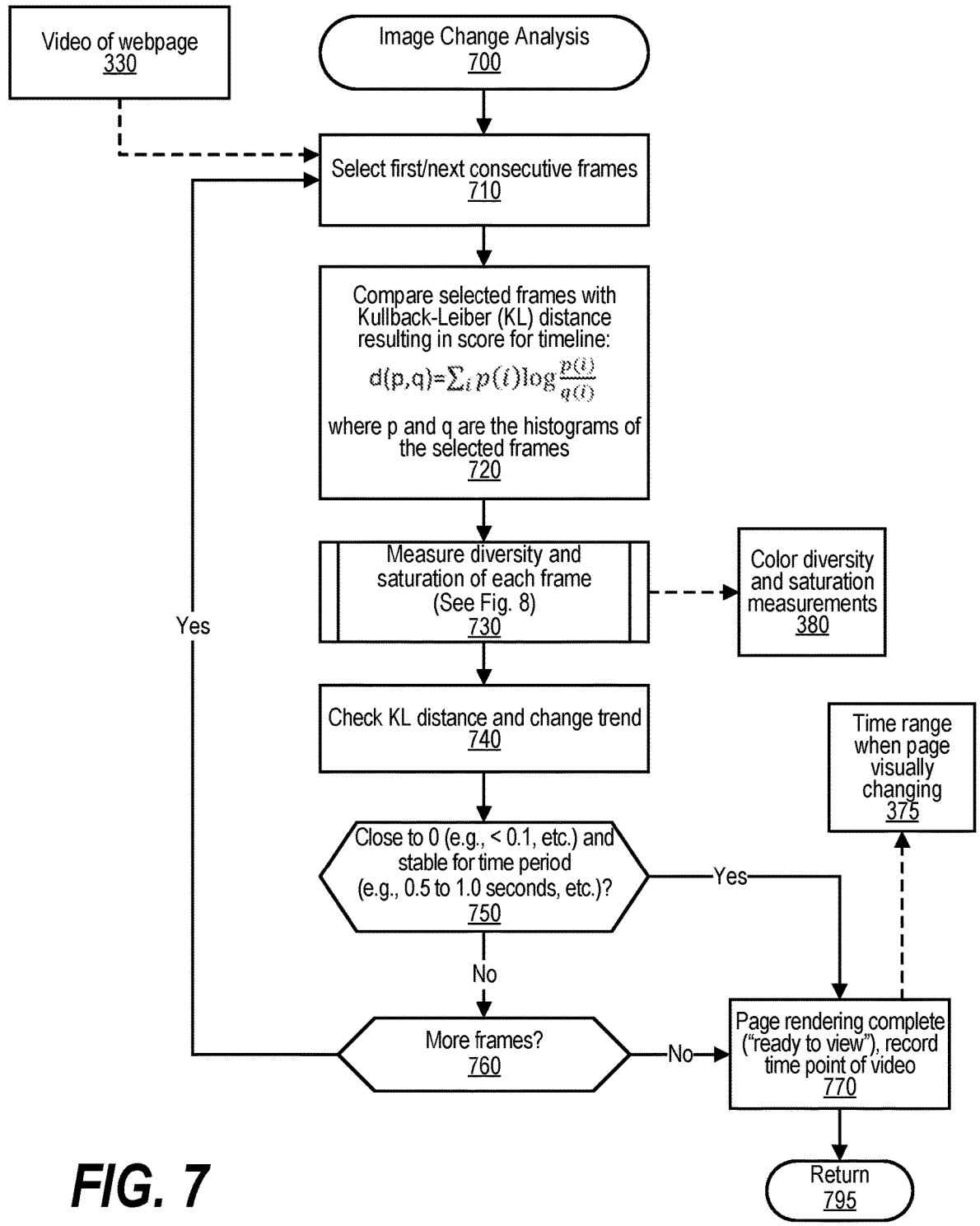
FIG. 7 is a depiction of a flowchart showing the logic used to perform image change analysis from the recorded video.

At predefined process 360, the process performs the Image Change Analysis routine (see FIG. 7 and corresponding text for processing details). This routine results in a time range when the webpage is visually changing which is stored in data store 375 as well as color diversity and saturation measurement data that are stored in data store 380.

Figure 9:
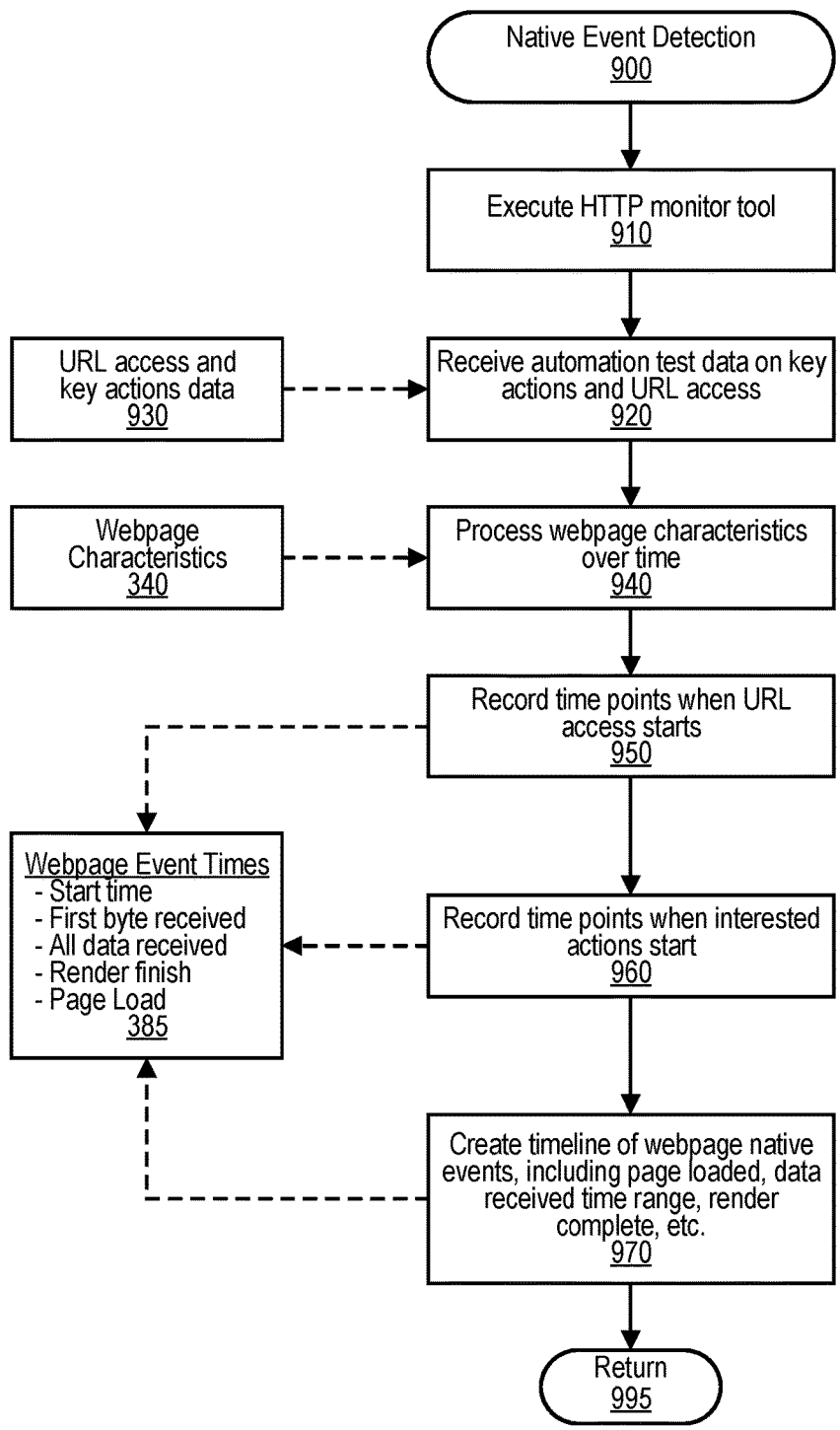
FIG. 9 is a depiction of a flowchart showing the logic used to perform native event detection from webpage characteristics gathered from the running of the automation test script.

At predefined process 365, the process performs the Native Event Detection routine (see FIG. 9 and corresponding text for processing details). This routine analyzes the webpage characteristics data from data store 340 and detects various webpage event times that are stored in data store 385. These webpage event times include items such as the start time of the webpage, time when the first byte was received, time when all data has been received, time when the rendering of the webpage is finished, and the time when the webpage has been loaded.

Figure 10:
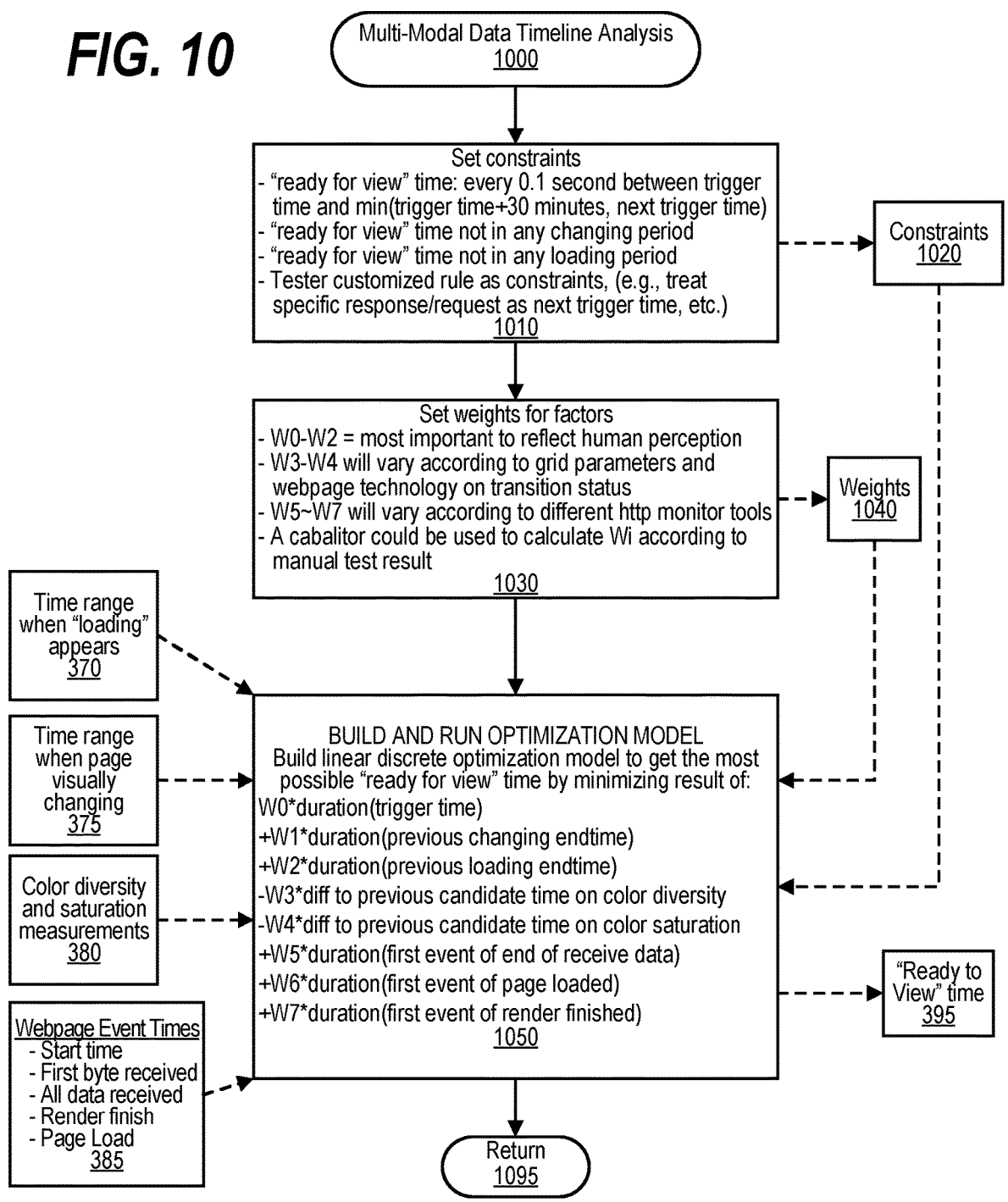
FIG. 10 is a depiction of a flowchart showing the logic used to perform a multi-modal data timeline analysis resulting in the amount of time taken to ready the webpage for viewing by a user.

At predefined process 390, the process performs the Multi-Modal Data Timeline Analysis routine (see FIG. 10 and corresponding text for processing details). This routine compiles data gathered by processes 350, 360, and 365 for form an analysis that results in the amount of time before the webpage is ready to use by a user of the webpage. This "ready to view" time is stored in data store 395.

Figure 4:
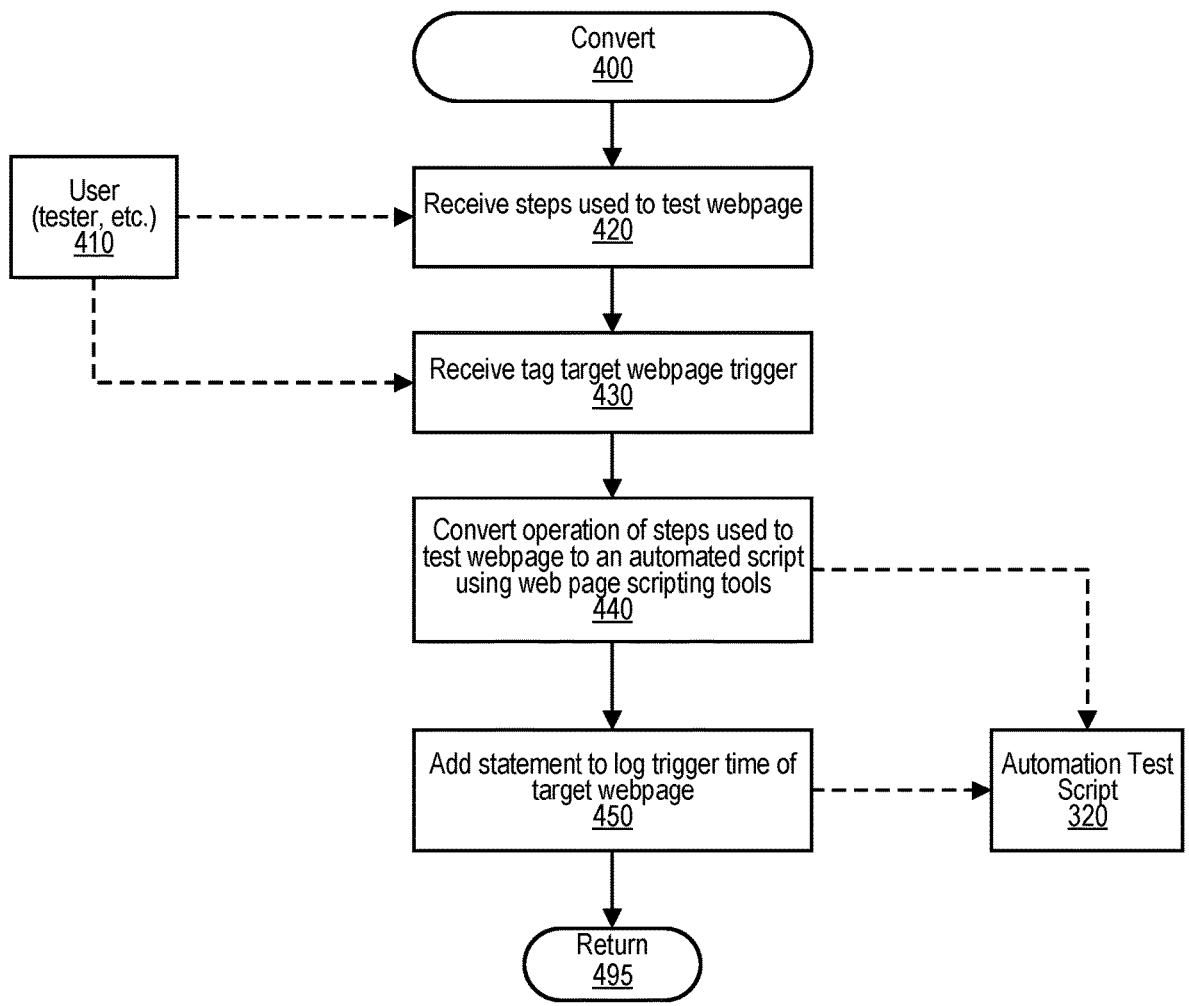
FIG. 4 is a depiction of a flowchart showing the logic used to convert web page operation steps to an automated test script.

FIG. 4 is a depiction of a flowchart showing the logic used to convert web page operation steps to an automated test script. FIG. 4 processing commences at 400 and shows the steps taken by a process that converts operations performed on a webpage to an automation test script. At step 420, the process receives steps used to test webpage from user 410. At step 430, the process receives one or more tag target webpage triggers from user 410. At step 440, the process converts the operation of steps used to test the webpage to an automated script using one or more web page scripting tools. The automation test script is stored in data store 320. At step 450, the process adds statements to the automation test script to log trigger times of the target webpage. FIG. 4 processing thereafter returns to the calling routine (see FIG. 3) at 495.

FIG. 5 is a depiction of a flowchart showing the logic used to record the running of the automation test script on a webpage. FIG. 5 processing commences at 500 and shows the steps taken by a process that records the running of the automation test script on the webpage. At step 520, the process runs automation test script 320 to create a digital recording (video) of images appearing on the webpage. The automation test script is playing on the webpage and can include navigation to the webpage URL or button-click action. In one embodiment, the recording is taken in five to ten frames per second. The digital recording is stored in data store 330.

At step 540, the process captures record webpage native characteristics (e.g., using webpage monitoring tool, etc.). The webpage characteristics are stored in data store 340 and include a log (timing) of all encountered webpage events and trigger times that occur during the script execution on the webpage. The process determines whether the automation test script is still playing (decision 560). If the automation test script is still playing, then decision 560 branches to the 'yes' branch which loops back to step 520 to continue playing the test script and continue recording video of the webpage and gathering webpage characteristics from the webpage. This looping continues until the automation test script is finished, at which point decision 560 branches to the 'no' branch exiting the loop.

At step 580, the process closes and/or finishes the video file that captured the playing of the automation test script running the webpage. FIG. 5 processing thereafter returns to the calling routine (see FIG. 3) at 595.

FIG. 6 is a depiction of a flowchart showing the logic used to detect the loading of a webpage from the recorded video. FIG. 6 processing commences at 600 and shows the steps taken by a process that detects the visual loading of the webpage using AI technology.

At step 610, the process detects difference areas in consecutive frames in past n seconds (e.g., five secs at ten frames per second, etc.). The detection is made by analyzing the video of the webpage that was stored in data store 330. At step 620, the process concatenates and clusters the difference areas that are possible into rectangular area. The process further generates a series of changing images in sequence in the rectangular area.

At step 630, the process checks if there are duplicates in the changing image with such duplicates extracted leaving the unique images in sequence. At step 640, the process grayscales and stacks the extracted images in sequence. The process further classifies the extracted images with a CNN+LSTM AI model that has been pretrained to check if the images depict a "loading . . . " video. The video images are input to trained AI system 100 and the AI system responds with a loading point detected in the images input to the AI system.

The process determines as to whether the AI system detected the video "loading . . . " in one of the difference areas (decision 650). If the AI system detected the "loading . . . " video, then decision 650 branches to the 'yes' branch whereupon at step 660, the process records the time range of start time and end time in data store 370.

Training of the AI system includes collecting typical "loading" videos as training data, especially the loading graphic files (e.g., gif, etc.) for the target product, including progress the indicator, the running cycle, the shining bar, etc. During training, the video is played capturing five to ten frames per second. The training process grayscales and stacks images in sequence, labels as "Yes" for "Loading . . . " video class. Training further adds more videos from open datasets and captures snapshots of interested webpages. The approach trains a CNN+LSTM network (AI model) to learn to classify the "loading . . . " video from other videos.

Returning to FIG. 6, If the AI system did not detect the "loading . . . " video in one of difference areas, then decision 650 branches to the 'no' branch whereupon, at step 670, the process finds a loop back in n seconds, considers the area as being a static area when the loop segment starts and loops and records the time range of start time and end time into data store 370. FIG. 6 processing thereafter returns to the calling routine (see FIG. 3) at 695.

FIG. 7 is a depiction of a flowchart showing the logic used to perform image change analysis from the recorded video. FIG. 7 processing commences at 700 and shows the steps taken by a process that performs an image change analysis. At step 710, the process selects the first set of consecutive frames from video data that was stored in data store 330. At step 720, the process compares the selected frames with Kullback-Leibler (KL) distance (relative entropy) resulting in a score for a timeline. Using the equation shown in FIG. 7, box 720, where p and q are the histograms of the selected frames.

Figure 8:
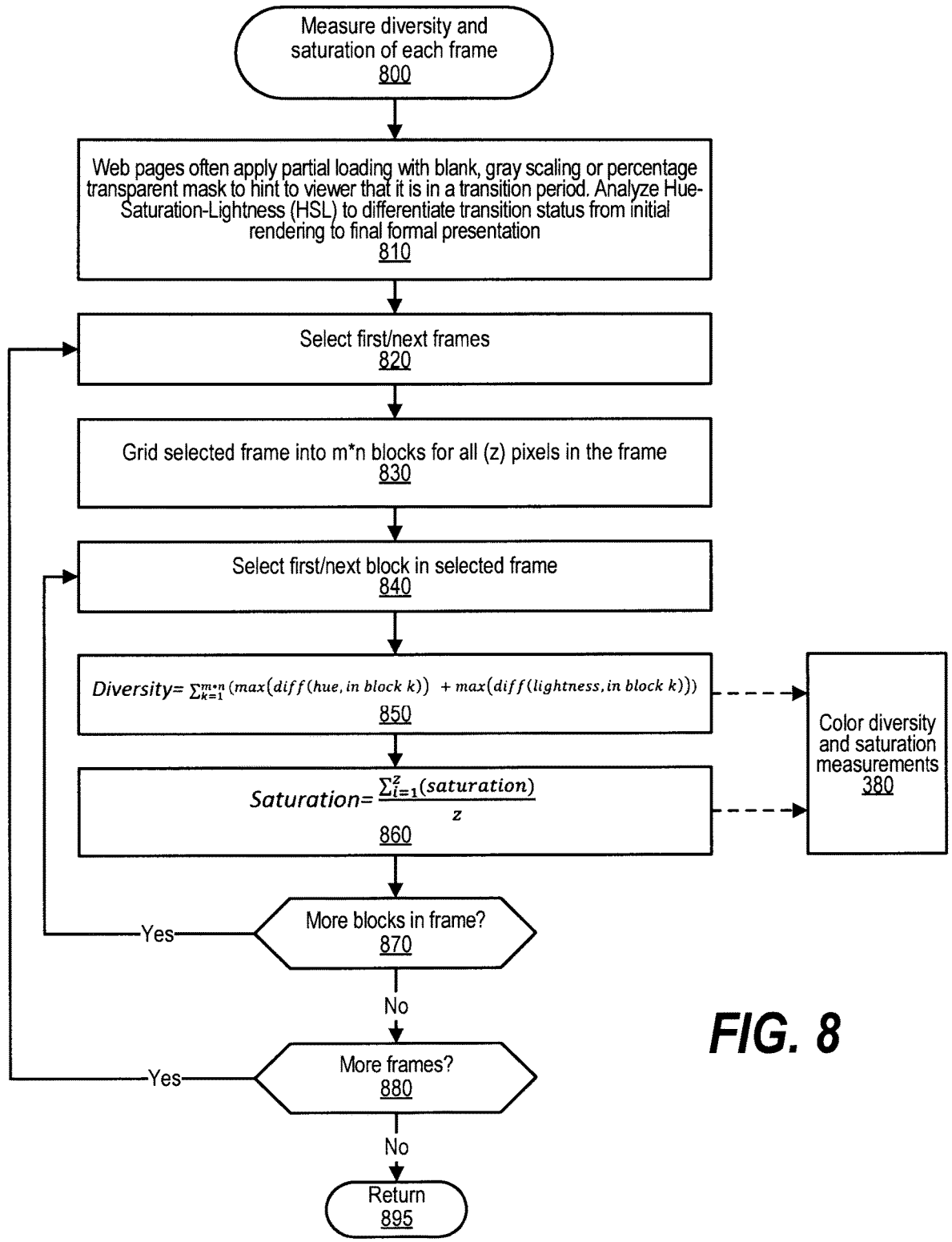
FIG. 8 is a depiction of a flowchart showing the logic used to measure the diversity and saturation of each frame in the video.

At predefined process 730, the process measures the diversity and saturation of each frame (see FIG. 8 and corresponding text for processing details). The resulting diversity and saturation values are stored in data store 380. At step 740, the process checks KL distance and change trend. The process determines as to whether the KL (relative entropy) is approaching zero (e.g., <0.1, etc.) and also whether the diversity and saturation values have been stable for a period of time surpassing a threshold (e.g., 0.5 to 1.0 seconds, etc.) (decision 750).

Until the KL distance approaches zero and the diversity and saturation values have been stable for a period of time, decision 750 branches to the 'no' branch to continue processing selected frames from the video, with decision 760 branching to the 'yes' branch and looping back to step 710 to select and process the next set of consecutive frames.

This looping continues until either the KL distance approaches zero and the diversity and saturation values have been stable for a period of time (with decision 750 branching to the 'yes' branch) or when there are no more frames to process (with decision 760 branching to the 'no' branch), at which point, at step 770, page rendering is deemed complete ("ready to view" by the user) and the time range when the page is visually changing is stored in data store 370. FIG. 7 processing thereafter returns to the calling routine (see FIG. 3) at 795.

FIG. 8 is a depiction of a flowchart showing the logic used to measure the diversity and saturation of each frame in the video. FIG. 8 processing commences at 800 and shows the steps taken by a process that measures the diversity and saturation of each frame in the video file taken when the webpage was being exercised by the automation test script. The approach recognizes that webpages often apply partial loading with blank, gray scaling or a percentage of transparent mask to hint to the viewer that the webpage is in a transition period and not yet ready for use by the user.

At step 810, the process analyzes the Hue-Saturation-Lightness (HSL) to differentiate the transition status from the initial rendering of the webpage to the final formal presentation of the webpage. At step 820, the process selects the first set of frames from the video file of the webpage being exercised by the automation test script. At step 830, the process divides the selected frame into a number (m*n) of blocks for all (z) pixels in the frame.

At step 840, the process selects the first block in selected frame. At step 850, the process calculates a diversity value for the selected block using the equation shown in step 850. The diversity value is stored in data store 380.

At step 860, the process calculates a saturation value for the selected block using the equation shown in step 860. The saturation value is stored in data store 380.

The process determines as to whether there are more blocks in the frame to process (decision 870). If there are more blocks in the frame to process, then decision 870 branches to the 'yes' branch which loops back to step 840 to select and calculate values for the next block as described above. This looping continues until all blocks in the frame have been processed, at which point decision 870 branches to the 'no' branch exiting the loop.

The process next determines as to whether there are more frames in the video file to process (decision 880). If there are more frames in the video to process, then decision 880 branches to the 'yes' branch which loops back to step 820 to select and process the next frames as discussed above. This looping continues until all frames in the video have been processed, at which point decision 880 branches to the 'no' branch exiting the loop. FIG. 8 processing thereafter returns to the calling routine (see FIG. 7) at 895.

FIG. 9 is a depiction of a flowchart showing the logic used to perform native event detection from webpage characteristics gathered from the running of the automation test script. FIG. 9 processing commences at 900 and shows the steps taken by a process that performs native webpage event detection. At step 910, the process executes a monitoring tool to monitor the performance of the webpage by the automation test script (e.g., an HTTP monitor tool, etc.). At step 920, the process receives automation test data on key actions and URL access. In one embodiment, this automation test data is received from data store 930.

At step 940, the process identifies and determines various webpage characteristics over time (the time period over which the webpage is being exercised by the automation test script). At step 950, the process records the time points when URL access starts. These time points are stored in data store 385. At step 960, the process records time points when various interested actions start on the webpage. These interested actions and times are stored in data store 385.

At step 970, the process creates a timeline of the various webpage native events, including when the webpage is loaded, the time range of when data is received, the time until rendering of the webpage is complete, etc. This timeline data is also stored in data store 385. FIG. 9 processing thereafter returns to the calling routine (see FIG. 3) at 995.

FIG. 10 is a depiction of a flowchart showing the logic used to perform a multi-modal data timeline analysis resulting in the amount of time taken to ready the webpage for viewing by a user. FIG. 10 processing commences at 1000 and shows the steps taken by a process that performs a multi-modal data timeline analysis using the data computed, gathered, and detected by the other processes previously described.

At step 1010, the process sets various constraints. In one embodiment, these constraints include the "ready for view" time as being every 0.1 second between a trigger time and a min(trigger time+30 minutes, next trigger time), the "ready for view" time as not being in any changing period, the "ready for view" time not in any loading period. In addition, a human user/tester can customize the rules as constraints, such as treating a specific response/request as the next trigger time, etc. These constraints are stored in data store 1020.

At step 1030, the process sets weights for the various factors CW being "weight"). In one embodiment, W0 to W2 are the most important to reflect human perception, W3 to W4 will vary according to grid parameters and webpage technology on transition status, W5 to W7 will vary according to the different http monitor tools. In addition, a calibrator could be used to calculate weights according to manual test result. These weight values are stored in data store 1040. At step 1050, the process builds and runs an optimization model. The approach builds a linear discrete optimization model in order to determine the most possible "ready for view" time. In one embodiment, this is achieved by minimizing the result of: W0*duration(trigger time)+W1*duration(previous changing endtime)+W2*duration(previous loading endtime)−W3*diff to previous candidate time on color diversity−W4*diff to previous candidate time on color saturation+W5*duration(first event of end of receive data)+W6*duration(first event of page loaded)+W7*duration(first event of render finished). The data utilized by the optimization model in step 1050 is retrieved from data stores 370, 375, 380, and 385.

In one embodiment, the optimization model incorporates a number of rules that are adhered to when determining the amount of time before the webpage is ready for use by the user. In this embodiment, these rules include 1) the time is later than trigger event; 2) the time is the end time of time range of changing, with earlier being better; 3) the time is the end time of the time range of loading, if identified; 4) the time is earlier than the "page loading" event; 5) the time is later than "first byte received" event, if "loading" is detected; 6) the time happened before periodically refresh request; and 7) the time at which the diversity and saturation is higher than previous period and stable for next period.

The result of running the optimization model is the amount of time before the webpage is ready to use by a user of the webpage which is stored in data store 395. FIG. 10 processing thereafter returns to the calling routine (see FIG. 3) at 1095.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method, implemented by an information handling system that determines an amount of time before a webpage is ready to use by a user, the method including a processor and a memory and further comprising:

capturing a digital recording of the webpage from an invocation of the webpage for a period of time sufficient to completely load the webpage, the capturing resulting in a plurality of sequenced image frames;

receiving, from a trained artificial intelligence (AI) system, a loading point in the sequenced image frames based on an analysis of a set of the sequenced image frames inputted to the trained AI system;

calculating a plurality of image diversity and saturation measurements on a plurality of consecutive image frames selected from the plurality of sequenced image frames, the calculating resulting in an image change analysis;

detecting a plurality of native webpage events and corresponding times from a set of webpage characteristics gathered from the captured digital recording;

establishing one or more constraints corresponding to the amount of time;

weighting one or more values corresponding to the loading point from the AI system, the plurality of image diversity and saturation measurements, and one or more values corresponding to the detected webpage events;

generating a linear discrete optimization model by combining the weighted one or more loading point values from the AI system, the weighted plurality of image diversity and saturation measurements, and the weighted one or more values corresponding to the detected webpage events; and calculating the amount of time before the webpage is ready to use by the user based on the loading point from the AI system, the image change analysis, the detected webpage events and their corresponding times, and by running the linear discrete optimization model, the running resulting in the amount of time before the webpage is ready to use by the user.

2. The method of claim 1 wherein receiving the loading point further comprises:
   detecting difference areas in a set of consecutive image frames;
   concatenating and clustering the difference areas of the set of consecutive image frames into a rectangular area; and
   removing one or more duplicate image frames from the set of consecutive image frames, the removal resulting in the set of the sequenced image frames that are input to the AI system.

3. The method of claim 1 wherein the detection of native webpage events and corresponding times further comprises:
   receiving a set of automation test data corresponding to one or more webpage actions; and
   scanning the set of webpage characteristics over the period of time, the scanning further comprising:
      recording the corresponding times when the plurality of native webpage events are found in the webpage characteristics; and
      creating a timeline of the plurality of native webpage events, wherein at least one of the webpage events is selected from the group consisting of a page loaded event, a data received time range, and a render complete event.

4. The method of claim 1 wherein the calculation of the plurality of image diversity and saturation measurements further comprises:
   analyzing a hue-saturation-lightness (HSL) corresponding to the plurality of sequenced image frames, the analysis resulting in a hue value, a saturation value, and a lightness value corresponding to at least a portion of each of the plurality of sequenced image frames;
   calculating one of the diversity measurements of each of the plurality of sequenced image frames based on the hue value, the saturation value, and the lightness value; and
   calculating the saturation measurement of at least the portion of each of the plurality of sequenced image frames.

5. The method of claim 4 further comprising:
   comparing a relative entropy of one or more sets of consecutive frames within the plurality of sequenced image frames, the comparing resulting in a set of scores over a timeline of the plurality of sequenced image frames;
   identifying an selected set of consecutive frames based on the relative entropy of the selected set approaching zero, the diversity measurement remaining stable over a time threshold, and the saturation measurement remaining stable over the time threshold.

6. The method of claim 4 further comprising:
   dividing each of the plurality of sequenced image frames into a plurality of blocks, wherein each of the blocks is the portion of each of the plurality of sequenced image frames.

7. An information handling system comprising:
   one or more processors;
   a memory coupled to at least one of the processors;
   a set of computer program instructions stored in the memory and executed by at least one of the processors in order to perform actions to determine an amount of time before a webpage is ready to use by a user, the actions comprising:
      capturing a digital recording of the webpage from an invocation of the webpage for a period of time sufficient to completely load the webpage, the capturing resulting in a plurality of sequenced image frames;
      receiving, from a trained artificial intelligence (AI) system, a loading point in the sequenced image frames based on an analysis of a set of the sequenced image frames inputted to the trained AI system;
      calculating a plurality of image diversity and saturation measurements on a plurality of consecutive image frames selected from the plurality of sequenced image frames, the calculating resulting in an image change analysis;
      detecting a plurality of native webpage events and corresponding times from a set of webpage characteristics gathered from the captured digital recording;
      establishing one or more constraints corresponding to the amount of time;
      weighting one or more values corresponding to the loading point from the AI system, the plurality of image diversity and saturation measurements, and one or more values corresponding to the detected webpage events;
      generating a linear discrete optimization model by combining the weighted one or more loading point values from the AI system, the weighted plurality of image diversity and saturation measurements, and the weighted one or more values corresponding to the detected webpage events; and
      calculating the amount of time before the webpage is ready to use by the user based on the loading point from the AI system, the image change analysis, the detected webpage events and their corresponding times, and by
      running the linear discrete optimization model, the running resulting in the amount of time before the webpage is ready to use by the user.

8. The information handling system of claim 7 wherein receiving the loading point further includes actions comprising:
   detecting difference areas in a set of consecutive image frames;
   concatenating and clustering the difference areas of the set of consecutive image frames into a rectangular area; and
   removing one or more duplicate image frames from the set of consecutive image frames, the removal resulting in the set of the sequenced image frames that are input to the AI system.

9. The information handling system of claim 7 wherein the detection of native webpage events and corresponding times further includes actions comprising:
   receiving a set of automation test data corresponding to one or more webpage actions; and
   scanning the set of webpage characteristics over the period of time, the scanning wherein the actions further comprise:
      recording the corresponding times when the plurality of native webpage events are found in the webpage characteristics; and
      creating a timeline of the plurality of native webpage events, wherein at least one of the webpage events is selected from the group consisting of a page loaded event, a data received time range, and a render complete event.

10. The information handling system of claim 7 wherein the calculation of the plurality of image diversity and saturation measurements further includes actions comprising:
   analyzing a hue-saturation-lightness (HSL) corresponding to the plurality of sequenced image frames, the analysis resulting in a hue value, a saturation value, and a lightness value corresponding to at least a portion of each of the plurality of sequenced image frames;
   calculating one of the diversity measurements of each of the plurality of sequenced image frames based on the hue value, the saturation value, and the lightness value; and
   calculating the saturation measurement of at least the portion of each of the plurality of sequenced image frames.

11. The information handling system of claim 10 wherein the actions further comprise:
   comparing a relative entropy of one or more sets of consecutive frames within the plurality of sequenced image frames, the comparing resulting in a set of scores over a timeline of the plurality of sequenced image frames;
   identifying an selected set of consecutive frames based on the relative entropy of the selected set approaching zero, the diversity measurement remaining stable over a time threshold, and the saturation measurement remaining stable over the time threshold.

12. The information handling system of claim 10 wherein the actions further comprise:
   dividing each of the plurality of sequenced image frames into a plurality of blocks, wherein each of the blocks is the portion of each of the plurality of sequenced image frames.

13. A computer program product stored in a computer readable storage medium, comprising computer program code that, when executed by an information handling system, determines an amount of time before a webpage is ready to use by a user by performing actions comprising:
   capturing a digital recording of the webpage from an invocation of the webpage for a period of time sufficient to completely load the webpage, the capturing resulting in a plurality of sequenced image frames;
   receiving, from a trained artificial intelligence (AI) system, a loading point in the sequenced image frames based on an analysis of a set of the sequenced image frames inputted to the trained AI system;
   calculating a plurality of image diversity and saturation measurements on a plurality of consecutive image frames selected from the plurality of sequenced image frames, the calculating resulting in an image change analysis;
   detecting a plurality of native webpage events and corresponding times from a set of webpage characteristics gathered from the captured digital recording;
   establishing one or more constraints corresponding to the amount of time;
   weighting one or more values corresponding to the loading point from the AI system, the plurality of image diversity and saturation measurements, and one or more values corresponding to the detected webpage events;
   generating a linear discrete optimization model by combining the weighted one or more loading point values from the AI system, the weighted plurality of image diversity and saturation measurements, and the weighted one or more values corresponding to the detected webpage events; and
   calculating the amount of time before the webpage is ready to use by the user based on the loading point from the AI system, the image change analysis, and the detected webpage events and their corresponding times, and by running the linear discrete optimization model, the running resulting in the amount of time before the webpage is ready to use by the user.

14. The computer program product of claim 13 wherein receiving the loading point further includes actions comprising:
   detecting difference areas in a set of consecutive image frames;
   concatenating and clustering the difference areas of the set of consecutive image frames into a rectangular area; and
   removing one or more duplicate image frames from the set of consecutive image frames, the removal resulting in the set of the sequenced image frames that are input to the AI system.

15. The computer program product of claim 13 wherein the detection of native webpage events and corresponding times further includes actions comprising:
   receiving a set of automation test data corresponding to one or more webpage actions; and
   scanning the set of webpage characteristics over the period of time, the scanning wherein the actions further comprise:
      recording the corresponding times when the plurality of native webpage events are found in the webpage characteristics; and
      creating a timeline of the plurality of native webpage events, wherein at least one of the webpage events is selected from the group consisting of a page loaded event, a data received time range, and a render complete event.

16. The computer program product of claim 13 wherein the calculation of the plurality of image diversity and saturation measurements further includes actions comprising:
   analyzing a hue-saturation-lightness (HSL) corresponding to the plurality of sequenced image frames, the analysis resulting in a hue value, a saturation value, and a lightness value corresponding to at least a portion of each of the plurality of sequenced image frames, wherein the portions are formed by dividing each of the plurality of sequenced image frames into a plurality of blocks;
   calculating one of the diversity measurements of each of the plurality of sequenced image frames based on the hue value, the saturation value, and the lightness value; and
   calculating the saturation measurement of at least the portion of each of the plurality of sequenced image frames.

17. The computer program product of claim 16 wherein the actions further comprise:
   comparing a relative entropy of one or more sets of consecutive frames within the plurality of sequenced image frames, the comparing resulting in a set of scores over a timeline of the plurality of sequenced image frames;
   identifying a selected set of consecutive frames based on the relative entropy of the selected set approaching zero, the diversity measurement remaining stable over a time threshold, and the saturation measurement remaining stable over the time threshold.

* * * * *